United States Patent [19]

Hlavaty

[11] Patent Number: 5,308,138
[45] Date of Patent: May 3, 1994

[54] DOOR CARTRIDGE MODULE WITH DISCRETE ENERGY ABSORBING ELEMENTS

[75] Inventor: David G. Hlavaty, Northville Twp., Wayne County, Mich.

[73] Assignee: General Motors Corporation, Detroit, Mich.

[21] Appl. No.: 992,661

[22] Filed: Dec. 18, 1992

[51] Int. Cl.⁵ .............................................. B60J 5/04
[52] U.S. Cl. ................................... 296/146.6; 49/502; 296/188
[58] Field of Search ............... 296/146 C, 188; 49/502

[56] References Cited

U.S. PATENT DOCUMENTS

| | | | |
|---|---|---|---|
| 4,428,157 | 1/1984 | Engelsberger et al. | 49/502 |
| 4,648,208 | 3/1987 | Baldamus et al. | 49/502 |
| 4,651,470 | 3/1987 | Imura et al. | 49/52 |
| 4,684,166 | 8/1987 | Kanodia | 296/146 C |
| 4,702,040 | 10/1987 | Hellriegel | 49/502 |
| 4,769,951 | 9/1988 | Kaaden | 49/502 |
| 4,876,825 | 10/1989 | Widrig et al. | 49/502 |
| 4,882,842 | 11/1989 | Basson et al. | 29/857 |
| 4,924,630 | 5/1990 | Lomasney et al. | 49/502 |
| 4,974,365 | 12/1990 | Ono | 49/502 |
| 5,033,236 | 7/1991 | Szerdahelyi et al. | 49/502 |
| 5,067,281 | 11/1991 | Dupuy | 49/502 |

Primary Examiner—Robert R. Song
Attorney, Agent, or Firm—Charles E. Leahy

[57] ABSTRACT

Support frame cartridge for mounting between inner and outer door panels includes a plurality of push-on mounting studs for mounting a pair of energy-absorbing pads. Notches are provided in the belt line cross-member of the support frame cartridge to better utilize the energy-absorbing pads increasing the dynamic side-impact protection to an occupant of the vehicle.

22 Claims, 2 Drawing Sheets

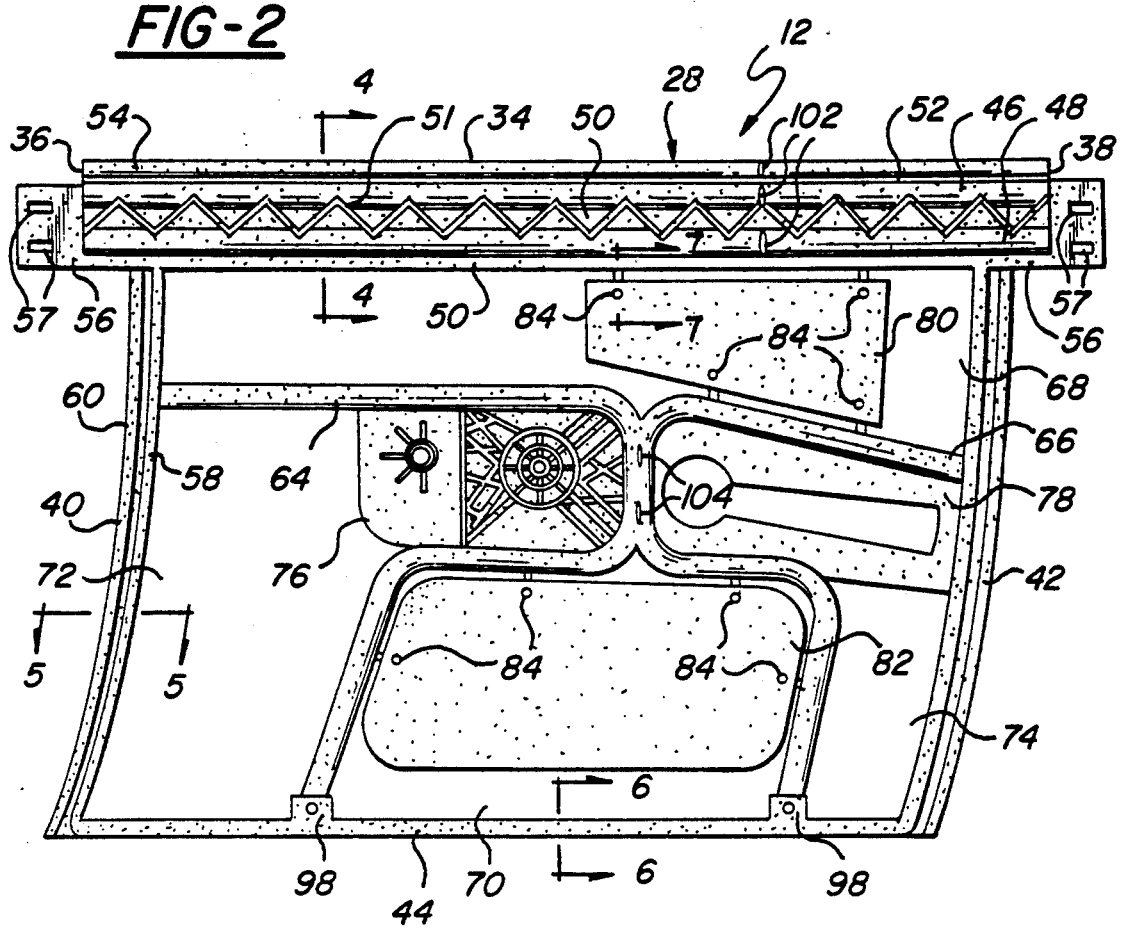
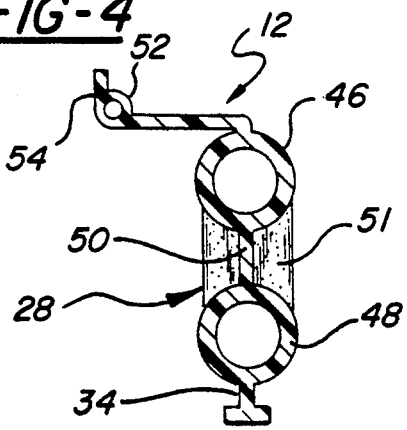
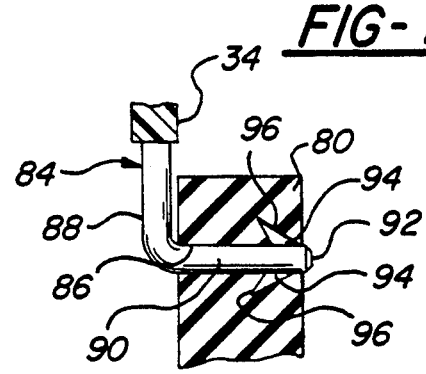
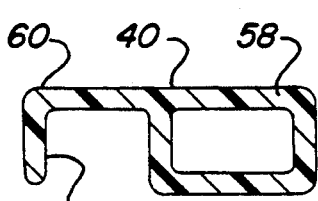

DOOR CARTRIDGE MODULE WITH DISCRETE ENERGY ABSORBING ELEMENTS

TECHNICAL FIELD

This invention relates to vehicle door assemblies and, more particularly, to vehicle doors having a reinforcing support frame cartridge or module.

RELATED PRIOR ART

Before this invention, various vehicle door constructions have been devised utilizing a reinforcing support frame module or cartridge which is preassembled with the various mechanical and/or electrical components of the door before final assembly with the inner and outer panels of the door. The modular constructions lends itself to increased productivity at a cost savings to the manufacturer. The support frame and panels may be fabricated from various materials, including lightweight metal and synthetic materials which reduce the overall weight of the door assembly.

An example of such a modular door construction is shown and described in U.S. Pat. No. 4,428,157, issued Jan. 31, 1984 to Ernst Engelsberger, et al., wherein a cartridge is mounted between inner and outer door panels. The cartridge includes a pair of plate-like members adhesively bonded to a hard foam core.

SUMMARY OF INVENTION AND ADVANTAGES

The present invention is for a vehicle door assembly of the general type discussed above but with improvements directed toward the attachment between the cartridge and energy-absorbing occupant protection members. The assembly comprises an outer door panel, an inner door panel spaced from the outer panel defining a cavity therebetween, support frame means disposed within the cavity between the inner and outer panels for providing structural integrity to the vehicle door, at least one energy-absorbing occupant protection member fabricated of rigid foam material disposed between said panels, and push-together connection means extending from the frame means for engaging and retaining the occupant protection member connected to a frame means in response to a force displacing the occupant protection member toward engagement with the frame means.

The invention advantageously provides new and improved attachment means for quickly and simply securing an occupant protecting energy absorbing member to a modular support frame cartridge of a vehicle door without the use of adhesives that may be objectionable from an environmental standpoint while at the same time increasing productivity by obviating the need required for cure time of an adhesive.

The occupant protection member absorbs impact forces through deformation providing additional protection to the occupant.

These and other features, objects and advantages of this invention will become more apparent from the following detailed description and drawings in which:

FIG. 2 is an elevational view of the modular support frame of FIG. 1;

FIG. 4 is a cross-sectional view taken along lines 4—4 of FIG. 2;

FIG. 5 is a cross-sectional view taken along lines 5—5 of FIG. 2;

FIG. 6 is a cross-sectional view taken along lines 6—6 of FIG. 2; and

FIG. 7 is an elevational view shown partially in cross-section illustrating the connection between the support frame and the foam panel.

DETAILED DESCRIPTION OF THE PREFERRED EMBODIMENT

Figure 1:
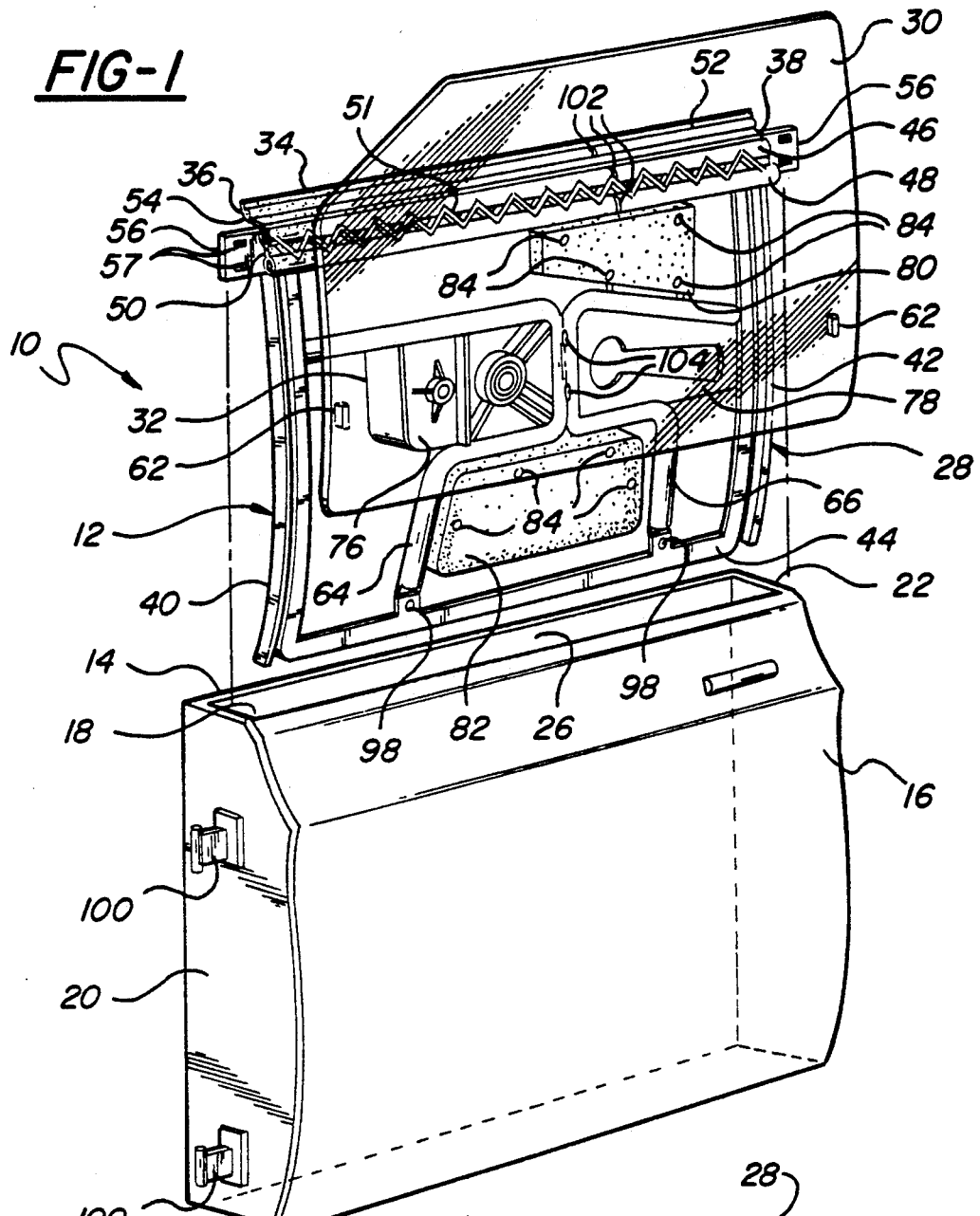
FIG. 1 is an exploded diagrammatic view of an automotive door assembly constructed according to the present invention.
Figure 3:
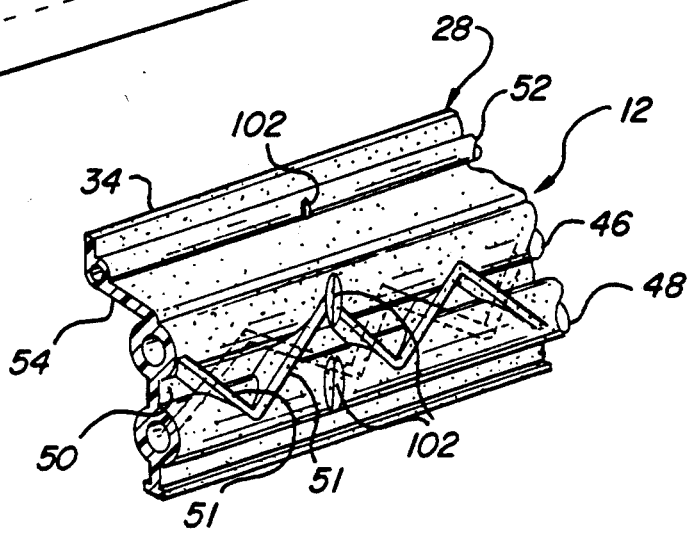
FIG. 3 is a fragmentary isometric view showing a notched portion of the belt line cross-member.

Turning now in greater detail to the drawings, there is diagrammatically illustrated in FIG. 1 a door assembly 10 for an automotive vehicle constructed according to a presently preferred embodiment of the invention. The door assembly comprises modular support frame means 12 provided for disposition between inner 14 and outer 16 door panels of the assembly 10. The terms inner, outer, rearward, and forward as used in this description are related to the relative positions of the assembly components as installed in a vehicle.

The inner and outer panels 14, 16 are spaced laterally from one another to define an open space or cavity 18 therebetween and are preferably joined to one another by front and rear connecting portions 20, 22 and a bottom connecting portion 24 so as to define a box-like structure having an opening 26 at the top thereof. This opening enables the support frame means 12 to be easily inserted therethrough from an upper position into the cavity 18 facilitating assembly. The panels 14, 16 as well as the connecting portions, 20, 22, 24 may be formed of metal, plastics, or any other suitable material.

The support frame means 12 comprises a support frame cartridge or module 28 mounting various electrical and/or mechanical hardware components of the door 10, including door glass 30 and a glass regulator mechanism 32 which may be of any various known types for controlling the raising and lowering of the window 30.

The support frame cartridge 28 has a rigid lattice-like open framework structure of generally tubular construction and is preferably fabricated entirely from structural plastics material utilizing gas-injection molding methods. As shown best in FIG. 2, the support frame cartridge 28 includes an upper belt line cross-member 34 extending generally horizontally between opposite front 36 and rear 38 ends thereof. The frame cartridge 28 also includes a pair of front and rear glass guidance rails 40, 42 disposed generally vertically and parallel to one another for guiding the glass 30 of the door assembly 10 with up and down motion. The guidance rails 40, 42 are connected at an upper end to the respective front and rear ends 36, 38 of the belt line cross-member 34 and further joined at opposite ends thereof by a lower cross-member 44 extending between the rails 40, 42 and generally parallel-spaced in relation to the belt line cross-member 34. Together, the cross members 34, 44 and rails 40, 42 provide a generally rectangular-shaped peripheral framework to the support frame cartridge 28.

The belt line cross-member 34 is designed to transmit frontal impact-related forces to the frame of the vehicle body. To provide the structural integrity needed to perform such a function, the belt line cross member 34 is formed with a pair of vertically spaced upper and lower tubular portions 46, 48 extending between the guidance rails 40, 42 and connected integrally by a co-extensive flat connecting mid portion 50. A reinforcing web 51 further interconnects the tubular members 44, 46 for added strength. The web 51 extends between the ends 36, 38 of the cross-member 34 in zig-zag fashion along the outboard side of the member 34.

A third smaller tubular portion 52 is also provided extending generally parallel to and spaced laterally from the main tubular portions 46, 48. An L-shaped portion 54 of connecting plate 50 integrally joins the third tubular portion 52 with the remaining structure of the belt line member 34. A pair of plate-like integrally formed mounting flanges 56 extend from their respective front 36 and rear 38 ends of the belt line member 34 and are formed with rectangular-shaped apertures 57 for providing a means of attaching the support frame cartridge 28 securely within the door cavity 18. The belt line cross-member 34 may be molded integrally with the remaining structure of the cartridge 28 or may be formed separately and subsequently attached to the remaining cartridge structure.

A cross-section of the front glass guidance rail 40 is shown in FIG. 5 and includes a structural tubular portion 58 of preferably rectangular construction and from which extends an L-shaped guide track portion 60 formed integrally with the tubular portion 58 and together with the tubular portion 58 defining a U-shaped guide track channel 61 open to the outboard side of the frame cartridge 28 for slidably accommodating guide blocks 62 mounted to the glass 30.

The lower cross-member 44 is preferably of a tubular construction, as best shown in FIG. 6, and further of rectangular shape formed as an integral extension of the rectangular tubular portions 58 of the guide rails 40, 42.

The support frame cartridge 28 further includes a pair of front and rear central mounting members 64, 66 accommodated within the open space of the peripheral frame work for mounting various components of the door assembly 10. The front mounting member 64 is attached at opposite ends to and extends between the front guide rail 40 and lower cross-member 44 along a serpentine path as seen in FIG. 2. The rear mounting member 66 is likewise connected at opposite ends to and extends between the rear guide rail 42 and lower cross-member 44 along a serpentine path which is generally the inverse of the path followed by the front mounting member 64. In addition to being connected to the guide rails 40, 42 and lower cross-member 44 at their ends, the central mounting members 64, 66 are connected directly to one another at a location intermediate their ends partitioning the open space within the peripheral framework into four quadrants, namely an upper quadrant 68, a lower quadrant 70, and front and rear quadrants 72, 74.

The mounting members 64, 66 are preferably of a cylindrical tubular construction, as illustrated in FIG. 2, and are preferably formed integrally with the guide rails 40, 42 and lower cross-member 44.

The front central mounting member 64 has formed integrally therewith a web-like mounting base 76 extending into the front quadrant 72 on which the glass regulator 32 is mounted. The rear mounting member 66 similarly includes an integral web-like mounting base 78 on which is mounted a window adjustment cam (not shown).

The door assembly 10 includes at least one and preferably two energy absorbing occupant protection members 80, 82 fabricated of rigid foam material securely attached to the support frame cartridge 28 by push-together connection means in the preferred form of mounting projections or studs 84 projecting from the frame cartridge 28 for engaging and retaining the energy absorbing members connected to the frame cartridge in response to forcing the energy absorbing members 80, 82 toward engagement with the frame cartridge 28. The energy absorbing members 80, 82 preferably comprise sheets or panels of closed-cell polystyrene foam which exhibits good energy absorbing properties and provides additional protection to the occupants of a vehicle by absorbing impact forces through deformation that might otherwise be transmitted to the occupant as a result of a side impact collision.

The support frame cartridge 28 is preferably provided with a plurality of the push-on mounting studs, a first group which projects into the upper quadrant 68 for supporting an upper one of the energy absorbing foam pads 80 in the vicinity adjacent the upper body region of an occupant when the assembly 10 is installed in the vehicle to provide good energy absorbing characteristics in that region, and a second group extending into the lower quadrant 70 for supporting a lower one of the energy absorbing foam pads 82 in the lower body region in order to improve energy absorption in that area.

The mounting studs 84 are preferably molded or otherwise formed integrally with the support frame cartridge 28 and, as best shown in FIG. 7, have an L-shaped cylindrical shank 88 formed with an insertion portion 90 extending normal to the cartridge toward the outboard side and terminating at a tapered distal end 92. The insertion portion 90 has a cross-sectional size which is substantially equal or slightly less than the apertures 86 in the pads 80, 82 so that when the pads 80, 82 are pressed onto the studs 84, the insertion portion 90 will fit snugly within each of the apertures 86. The snug fit between the insertion portions 90 and apertures 86 discourages the energy absorbing foam pads 80, 82 from vibrating or moving when the door assembly 10 is installed in the vehicle.

In order to assure that the energy absorbing pads 80, 82 remain firmly secured to the support frame cartridge 28 after being pressed into engagement with the mounting studs 84, the insertion portions 90 are provided with at least one and preferably a plurality of radial projections or barbs 94 which extend radially outwardly of the insertion portion 90 of the studs 84 and as such are radially larger than the apertures 86 whereupon pressing the pads 80, 82 into engagement with the studs 84 causes the projections 94 to penetrate (i.e., extend into the pad material) and become embedded within the walls of the apertures 86, as shown in FIG. 7, thereby providing frictional resistance to the removal of the pads 80, 82 following installation. The barbs 94 may be of a generally triangular shape as shown in FIG. 8 presenting a sharp point or tip 96 that bites into the foam pads 80, 82 to prevent or hinder removal of the pads.

As can be seen in FIG. 2, the upper energy-absorbing pad 80 is provided with four such spaced apart peripheral apertures 86 for insertably accommodating a corresponding group of four of the mounting studs 84, two of which extend downwardly into the upper quadrant 68 from the belt line member 34 and the other two of which extend upwardly into the quadrant 68 from the rearward mounting member 64. Similarly, the lower energy-absorbing pad 82 is provided with four spaced apart peripheral apertures 86 for insertably accommodating a second corresponding group of four of the mounting studs 84, two of which project downwardly into the lower quadrant 70 from each of the forward 64 and rearward 66 mounting members, as shown in FIG. 2, and the other two of which extend generally sideways into the lower quadrant 70 from different locations of the forward 64 and rearward 66 mounting members.

Hence, the push-together connection means of this invention enables the energy-absorbing pads 80, 82 to be quickly and securely mounted to the support frame cartridge by simply aligning the apertures 86 with the mounting studs 84 and thereafter pushing the pads 80, 82 firmly against the support frame cartridge 28 wherein the studs 84 extend into the apertures 86 causing the barbs 94 to penetrate and embed in the energy-absorbing pad material thereby providing a mechanical frictional resistance to removal of the panel.

The support frame cartridge 28 also includes another pair of mounting flanges 98 formed integrally with and extending upwardly from the lower cross-member 44 and connecting the front and rear mounting members 64, 66 to the lower cross-member 44 and further provided with a hole to receive a bolt or other suitable fastener for mounting the cartridge 28 within the cavity 18.

To construct the assembly 10, the door panels 14, 16 are joined to one another in the manner shown in FIG. 1 during a first pre-assembly operation and, at a separate station, the energy-absorbing pads 80, 82 and various other mechanical components are mounted on the support frame cartridge 28 which is then transported to a final assembly station where the cartridge 28 is lowered into the cavity 18 through the opening 26 and secured in place by mounting flanges 56, 98 and fasteners (not shown). The door assembly 10 is then attached to the vehicle by hinges 100 mounted to the front connecting portion 20.

The belt line cross-member 34 is provided with discrete preferential failure initiation sites or crush initiators in the preferred form of vertically oriented notches 102 formed in each of the tubular portions 46, 48 and 52 of the belt line member 34 preferably during the molding operation of the cross-member 34 in the vicinity of the upper energy-absorbing pad. These notches 102 are preferably formed in the outboard side of the cartridge 28 and cause the belt line structure 34 to fracture at the notches 102 under a prescribed load to better utilize the energy absorbing pads 80, 82. The central mounting members 64, 66 may be similarly provided with preferential failure initiation sites which may comprise similar vertically oriented notches 104 at the juncture of the members 64, 66 to cause the mounting members 64, 66 to fracture at a prescribed load. Together, the energy absorbing pads 80, 82 and notches 100, 102 provide dynamic side impact protection.

While a preferred embodiment of this invention has been shown and described, other modifications will be apparent to those skilled in the art. Accordingly, the scope of this invention is set forth in the following claims.

What is claimed is:

1. A vehicle door assembly, comprising:
   an outer panel;
   an inner panel;
   modular support frame means disposed between said panels for providing structural integrity to said door assembly;
   at least one energy-absorbing occupant protection member disposed between said panels; and
   push-together connection means extending from said frame means for engaging and retaining said occupant protection member connected to said frame means in response to forcing said occupant protection member toward engagement with said frame means.

2. The vehicle door assembly of claim 1 wherein said support frame means includes hollow plastic tube means and said connection means comprises at least one mounting stud projecting from said frame means.

3. The vehicle door assembly of claim 2 wherein said occupant protection member includes an aperture for insertably accommodating said mounting stud.

4. The vehicle door assembly of claim 3 wherein said mounting stud includes at least one radial projection extending radially outwardly of said stud and being radially larger than said aperture.

5. The vehicle door assembly of claim 4 wherein said radial projection comprises a barb.

6. The vehicle door assembly of claim 4 wherein said mounting stud has a cross-sectional size generally equal to a cross-sectional size of said aperture.

7. The vehicle door assembly of claim 4 wherein said studs are formed integrally with said frame means.

8. The vehicle door assembly of claim 3 wherein said studs extend toward said outer panel.

9. The vehicle door assembly of claim 3 wherein said frame means includes a plurality of said mounting studs.

10. The vehicle door assembly of claim 1 wherein said assembly includes a plurality of said occupant protection members.

11. The vehicle door assembly of claim 1 wherein said occupant protection member is fabricated of rigid foam material.

12. The vehicle door assembly of claim 11 wherein said rigid foam material comprises closed-cell polystyrene foam.

13. The vehicle door assembly of claim 1 wherein said frame means includes a belt line cross-member including discrete preferential failure initiation sites.

14. The vehicle door assembly of claim 13 wherein said failure initiation sites comprise at least one notch formed in said belt line cross-member.

15. The vehicle door assembly of claim 14 wherein said notch extends transversely of said belt line cross-member.

16. The vehicle door assembly of claim 15 wherein notch is formed on an outward side of said belt line cross-member adjacent said outer panel.

17. The vehicle door assembly of claim 16 wherein said frame means is fabricated of plastic material.

18. The vehicle door assembly of claim 17 wherein said belt line cross-member includes at least one tubular portion provided with said notch.

19. The vehicle door assembly of claim 17 wherein said frame means includes front and rear glass guidance rails each having a tubular portion and a glass guidance channel.

20. A cartridge module for mounting between inner and outer door panels of a vehicle door assembly, said cartridge module comprising:
   a rigid frame having a pair of front and rear glass guidance rails for supporting and guiding window glass, an upper belt-line cross-member extending generally horizontally between said guidance rails, and a lower cross-member spaced from said belt-line cross-member and extending generally horizontally between said guidance rails;

an energy-absorbing occupant protection member disposed between said guidance rails and said upper and lower cross-members and fabricated of rigid energy-absorbing foam material, said occupant protection member including a plurality of spaced-apart apertures of predetermined size; and a plurality of mounting studs formed as an integral portion of said frame and corresponding in number to the number of apertures, said mounting studs each having an insertion position extending generally normal to said frame and having a cross-sectional size corresponding substantially to the size of said apertures, said insertion portion extending into said apertures for mounting said occupant protection member on said frame, said insertion portions each including a plurality of radial projections radially larger than said apertures, said radial projections extending into said rigid foam material in response to application of a force displacing said occupant protection member toward engagement with said mounting studs to resist disengagement of said occupant protection member from said frame.

21. The cartridge module of claim 20 wherein said rigid frame is a tubular molded plastic frame and wherein said belt line cross-member is molded as an integral part of said frame.

22. The cartridge module of claim 20 wherein said cross-member is formed separately and is subsequently secured to said rails to complete said frame.

* * * * *